US012052060B2

(12) United States Patent
Coyle et al.

(10) Patent No.: US 12,052,060 B2
(45) Date of Patent: Jul. 30, 2024

(54) SYSTEMS AND METHODS FOR DETECTING AND MITIGATING PERIODIC AND TRANSIENT INTERFERENCE IN A NETWORK

(71) Applicant: Verizon Patent and Licensing Inc., Basking Ridge, NJ (US)

(72) Inventors: Timothy E. Coyle, Chicopee, MA (US); Hector A. Garcia Crespo, N Richland Hills, TX (US); Matthew Kapala, North Billerica, MA (US); Jason A. Birr, Lithia, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 327 days.

(21) Appl. No.: 17/652,806

(22) Filed: Feb. 28, 2022

(65) Prior Publication Data

US 2023/0275675 A1    Aug. 31, 2023

(51) Int. Cl.
| | |
|---|---|
| *H04W 24/08* | (2009.01) |
| *H04B 1/10* | (2006.01) |
| *H04B 15/00* | (2006.01) |
| *H04W 24/00* | (2009.01) |
| *H04W 24/02* | (2009.01) |

(52) U.S. Cl.
CPC ............ *H04B 15/00* (2013.01); *H04W 24/02* (2013.01); *H04W 24/08* (2013.01)

(58) Field of Classification Search
CPC ....... H04B 15/00; H04W 24/02; H04W 24/08
USPC .......................................................... 455/423
See application file for complete search history.

(56) References Cited

U.S. PATENT DOCUMENTS

| | | | |
|---|---|---|---|
| 2019/0312779 A1* | 10/2019 | Magzimof | .......... H04L 41/0894 |
| 2022/0173849 A1* | 6/2022 | Rahman | ................ H04W 24/02 |

FOREIGN PATENT DOCUMENTS

| | | | | |
|---|---|---|---|---|
| EP | 3432642 A1 * | 1/2019 | ......... | H04B 7/18504 |
| WO | WO-2021026509 A1 * | 2/2021 | ........... | H04L 41/147 |

* cited by examiner

*Primary Examiner* — Tanmay K Shah

(57) ABSTRACT

A device may receive time domain PRB data associated with a plurality of base stations of a network, and may transform the time domain PRB data into frequency domain PRB data. The device may identify, based on the frequency domain PRB data, periodic interference patterns associated with the network, and may process periodic data associated with the periodic interference patterns, with a clustering model, to identify clusters of periodic interference patterns. The device may utilize a time offset analysis to link clusters and identify a transient periodic interferer, and may process cluster data associated with the clusters and the transient periodic interferer, and public transportation data, with a machine learning model, to predict a route associated with the transient periodic interferer. The device may perform one or more actions based on the route associated with the transient periodic interferer.

20 Claims, 11 Drawing Sheets

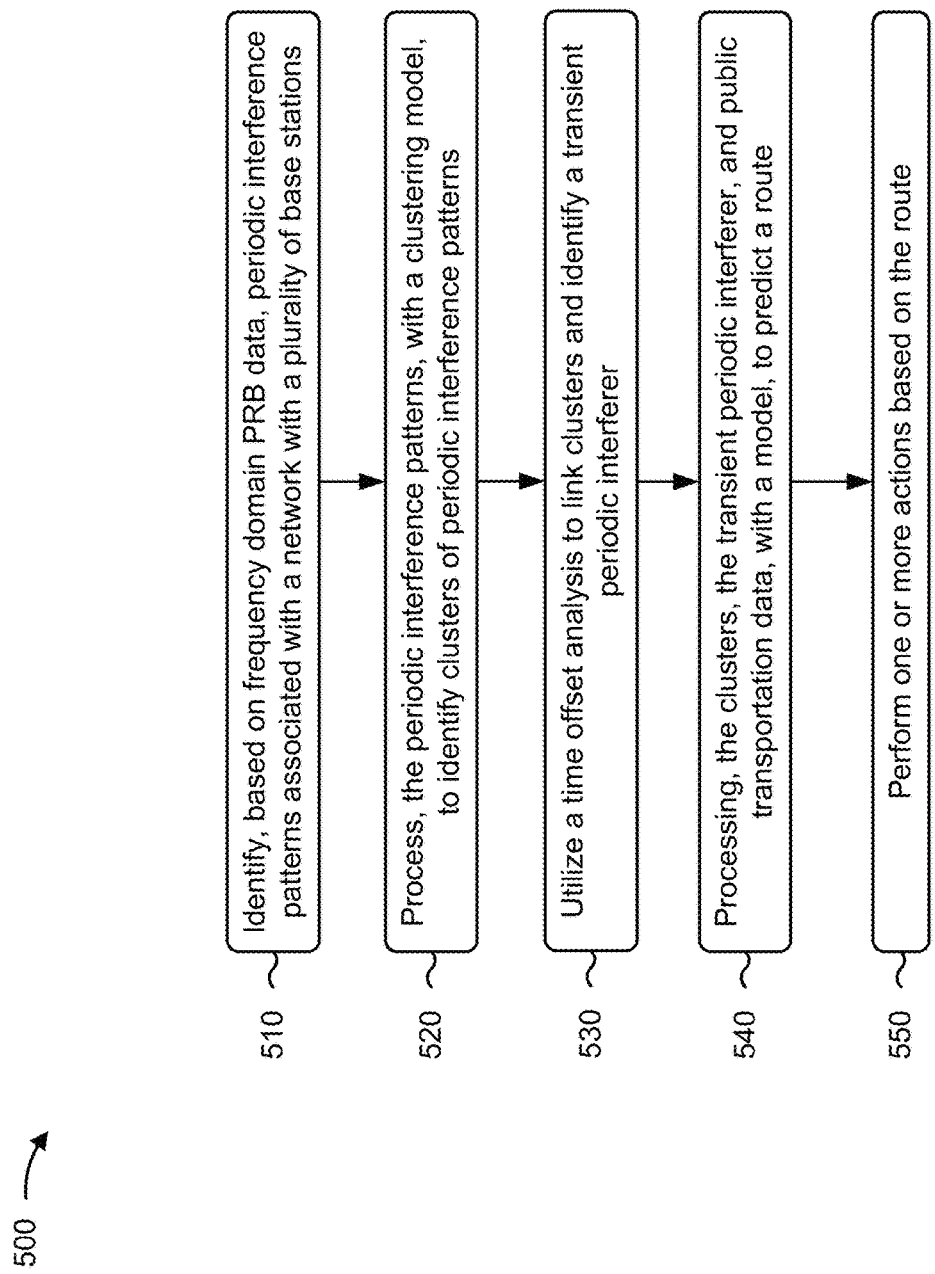

SYSTEMS AND METHODS FOR DETECTING AND MITIGATING PERIODIC AND TRANSIENT INTERFERENCE IN A NETWORK

BACKGROUND

Common types of interference in a cellular network (e.g., a radio access network (RAN)) are self-interference, multiple access interference, co-channel interference (CCI), and adjacent channel interference (ACI). Self-interference is induced by signals that are transmitted on a shared transmitter. Multiple access interference is induced by transmission from multiple radios using a same frequency resource. CCI occurs in links that re-use the same frequency channel. ACI is the interference induced between links that communicate in a same geographical location using neighboring frequency bands.

BRIEF DESCRIPTION OF THE DRAWINGS

FIG. 5 is a flowchart of an example process for detecting and mitigating periodic and transient interference in a network.

DETAILED DESCRIPTION OF EXAMPLE EMBODIMENTS

Figure 1A:
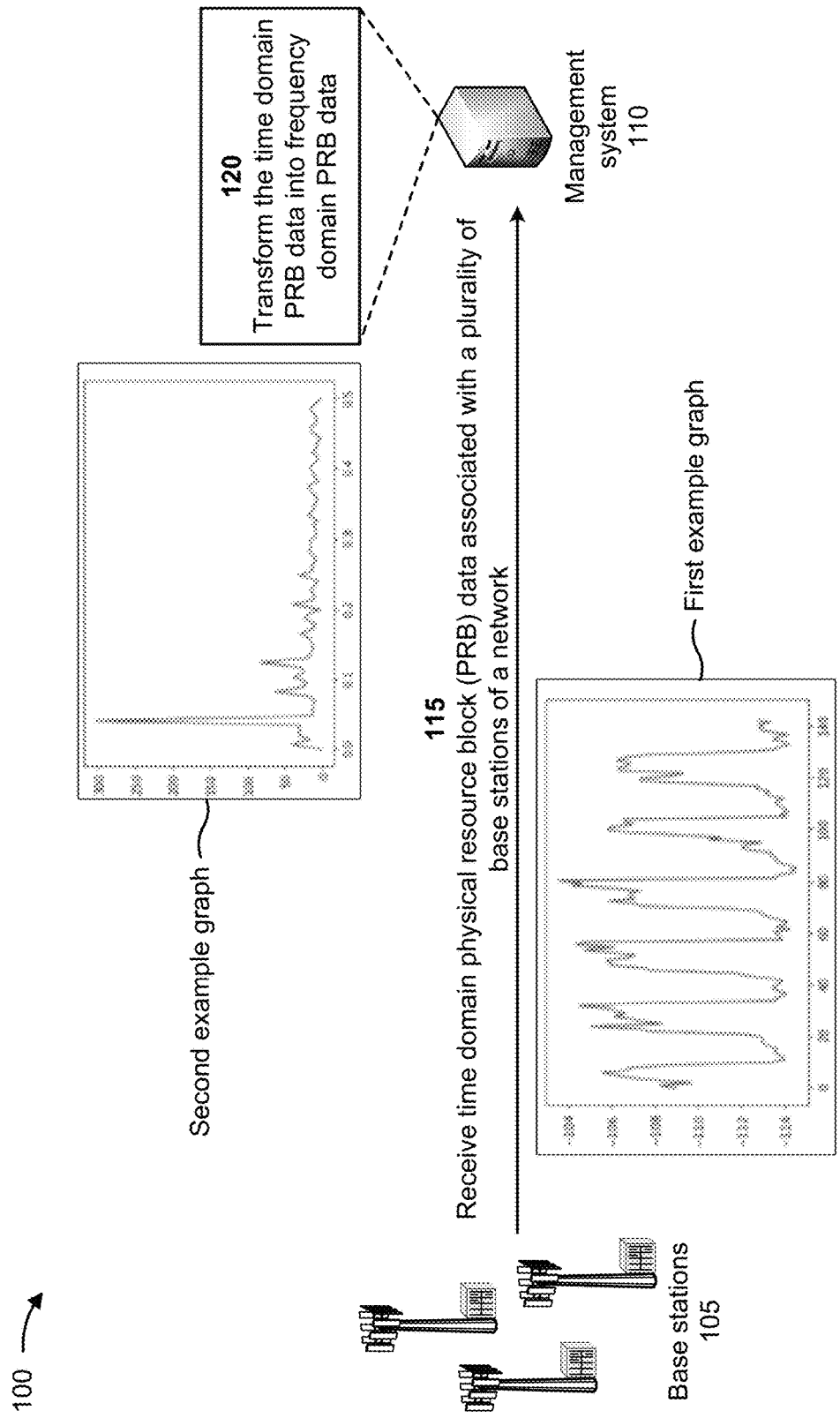
FIGS. 1A-1G are diagrams of an example associated with detecting and mitigating periodic and transient interference in a network.

The following detailed description of example implementations refers to the accompanying drawings. The same reference numbers in different drawings may identify the same or similar elements.

Identifying and correcting interference issues in a network is a challenging but critical task. Network users (e.g., user equipment or UEs) near an interference source will experience degraded call success rates, poor voice quality, reduced data throughput, and/or the like. Detecting, locating, and ultimately eliminating sources of RF interference is an essential strategy for service providers to ensure customer satisfaction. Some interference may be caused by a periodic interferer (e.g., periodic interference) or a transient interferer (e.g., transient interference). Periodic interference may include a narrow band signal that appears in the network at fixed time intervals. Transient interference may include a source of interference that moves through a network in a particular pattern. However, current techniques for detecting network interference are unable to detect periodic interference and transient interference.

Thus, current techniques for detecting network interference consume computing resources (e.g., processing resources, memory resources, communication resources, and/or the like), networking resources, and/or other resources associated with degrading call success rates for UEs based on periodic interference and transient interference, providing poor voice quality for UEs based on periodic interference and transient interference, providing reduced data throughput for UEs based on periodic interference and transient interference, dispatching technicians to unsuccessfully identify and/or locate sources of periodic interference and transient interference, and/or the like.

Some implementations described herein provide a management system that detects and mitigates periodic and transient interference in a network. For example, the management system may receive time domain physical resource block (PRB) data associated with a plurality of base stations of a network, and may transform the time domain PRB data into frequency domain PRB data. The management system may identify, based on the frequency domain PRB data, periodic interference patterns associated with the network, and may process periodic data associated with the periodic interference patterns, with a clustering model, to identify clusters of periodic interference patterns. The management system may utilize a time offset analysis to link clusters and identify a transient periodic interferer, and may process cluster data associated with the clusters and the transient periodic interferer, and public transportation data, with a model (e.g., a machine learning model), to predict a route associated with the transient periodic interferer. The management system may perform one or more actions based on the route associated with the transient periodic interferer.

In this way, the management system detects and mitigates periodic and transient interference in a network. For example, the management system may identify periodic interference patterns associated with the network, and may identify transient, or moving, interference patterns associated with the network based on the periodic interference patterns. The management system may predict a route and/or a type of transportation associated with a source of the transient interference patterns. Thus, the management system may conserve computing resources, networking resources, and/or other resources that would have otherwise been consumed by degrading call success rates for UEs based on periodic interference and transient interference, providing poor voice quality for UEs based on periodic interference and transient interference, providing reduced data throughput for UEs based on periodic interference and transient interference, dispatching technicians to unsuccessfully identify and/or locate sources of periodic interference and transient interference, and/or the like.

FIGS. 1A-1G are diagrams of an example 100 associated with detecting and mitigating periodic and transient interference in a network. As shown in FIGS. 1A-1G, example 100 includes a plurality of base stations 105 associated with a management system 110. Further details of the base stations 105 and the management system 110 are provided elsewhere herein.

As shown in FIG. 1A, and by reference number 115, the management system 110 may receive time domain PRB data associated with a plurality of base stations 105 of a network. For example, each of the base stations 105 may generate PRB data in a time domain. One PRB may span twelve subcarriers, and each subcarrier may include a 15 kilohertz (kHz) spacing. Thus, one PRB may be 180 kHz in frequency and one slot long in time. A PRB is a smallest unit of resources that can be allocated to a user (e.g., a user equipment or UE). In some implementations, the PRB data may include data identifying uplink noise levels associated with the base stations 105, geographical locations of the base stations 105, slices of a spectrum utilized by the base stations 105, strengths of signals in the spectrum generated by the base stations 105, and/or the like. FIG. 1A includes a first example graph depicting PRB data received from a base station 105, where the horizontal-axis provides an index of the PRB data that can be associated with time.

The management system 110 may periodically receive the time domain PRB data from the base stations 105, may continuously receive the time domain PRB data from the base stations 105, may receive the time domain PRB data based on providing a request for the time domain PRB data to the base stations 105, and/or the like.

As further shown in FIG. 1A, and by reference number 120, the management system 110 may transform the time domain PRB data into frequency domain PRB data. For example, the management system 110 may apply a transform to the time domain PRB data in order to transform the time domain PRB data into the frequency domain PRB data. Transferring the time domain PRB data into the frequency domain PRB data may enable the management system 110 to search for frequencies with significant magnitude that would identify the PRB data as periodic. In some implementations, the management system 110 may apply a Fast Fourier Transform (FFT) to the time domain PRB data in order to transform the PRB data from the time domain into the frequency domain. FIG. 1A includes a second example graph depicting the PRB data of the first example graph after the management system 110 applies the FFT to the time domain PRB data (e.g., where the x-axis is associated with frequency).

Figure 1B:
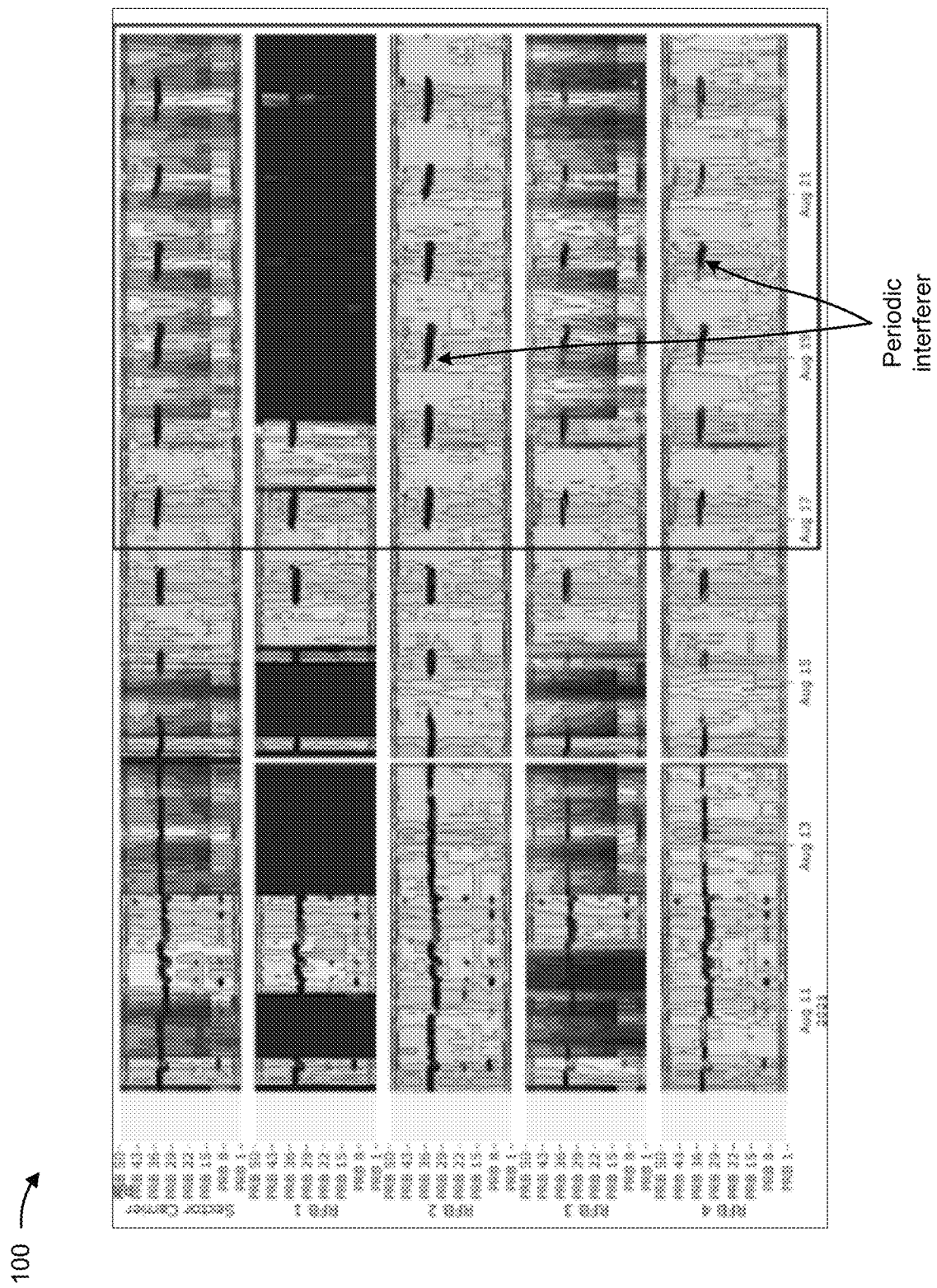

FIG. 1B depicts heatmap image of the time domain PRB data received from one of the base stations 105 over time (e.g., ten or more days). As shown, there is likely to be a periodic narrow band interferer associated with PRB 36. The heatmap image shows that the periodic narrow band interferer is on all four branches of the base station 105, but is most clearly visible on branches two and four of the base station 105. The top portion of the heatmap image depicts a sector carrier average of the four branches of the base station 105. The sector carrier average shows that the periodic narrow band interferer is present even in aggregate.

Figure 1C:
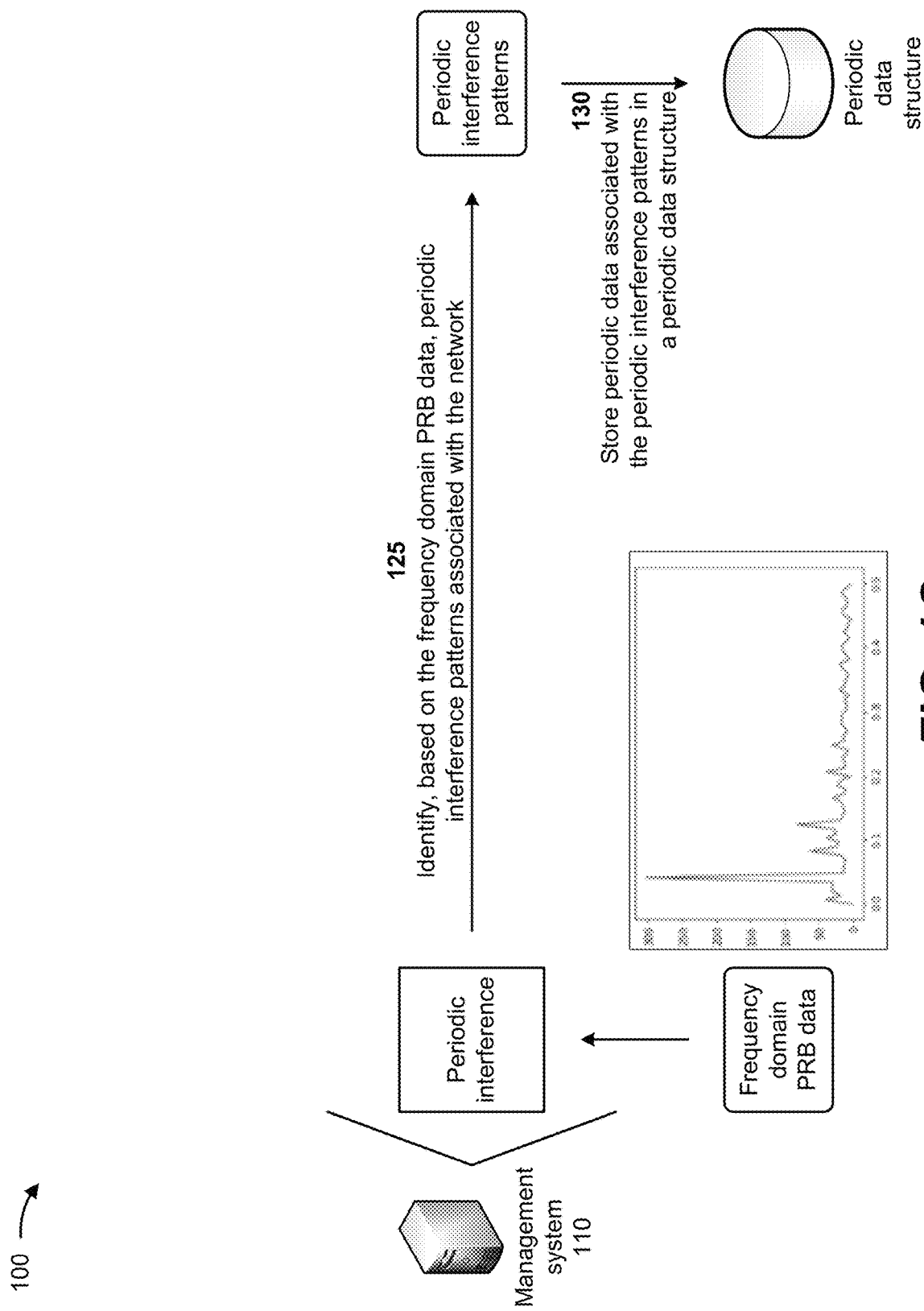

As shown in FIG. 1C, and by reference number 125, the management system 110 may identify, based on the frequency domain PRB data, periodic interference patterns associated with the network. For example, a periodic interference pattern may include a narrow band signal that appears at fixed intervals. A periodic interference pattern may be caused by faulty equipment and/or jammers in a stationary location but only operating during certain time periods (e.g., restaurants, stores, offices, and/or the like), faulty equipment and/or jammers on public transit moving through a network, vehicles and boats in and around harbors, ports, and major highways, and/or the like. The management system 110 may analyze the frequency domain PRB data to identify frequencies (e.g., of the frequency domain PRB data) that satisfy a threshold frequency magnitude. The management system 110 may identify the frequency domain PRB data associated with the frequencies that satisfy the threshold frequency magnitude as the periodic interference patterns associated with the network.

As further shown in FIG. 1C, and by reference number 130, the management system 110 may store periodic data associated with the periodic interference patterns in a periodic data structure. For example, the periodic interference patterns may be associated with periodic data that includes data identifying identifiers of base stations 105 (e.g., cell identifiers), periods, magnitudes, and frequencies (e.g., in the time domain). The management system 110 may store the data identifying the identifiers of base stations 105, the periods, the magnitudes, and the frequencies in a periodic data structure (e.g., a database, a table, a list, and/or the like) associated with the management system 110. The periodic data may enable the management system 110 to provide to users of the management system 110 information indicating which interferences are periodic and when the interferences are expected to occur. The management system 110 may also utilize the periodic data stored in the periodic data structure for transient correlation to identify transient sources of interference, as described below.

Figure 1D:
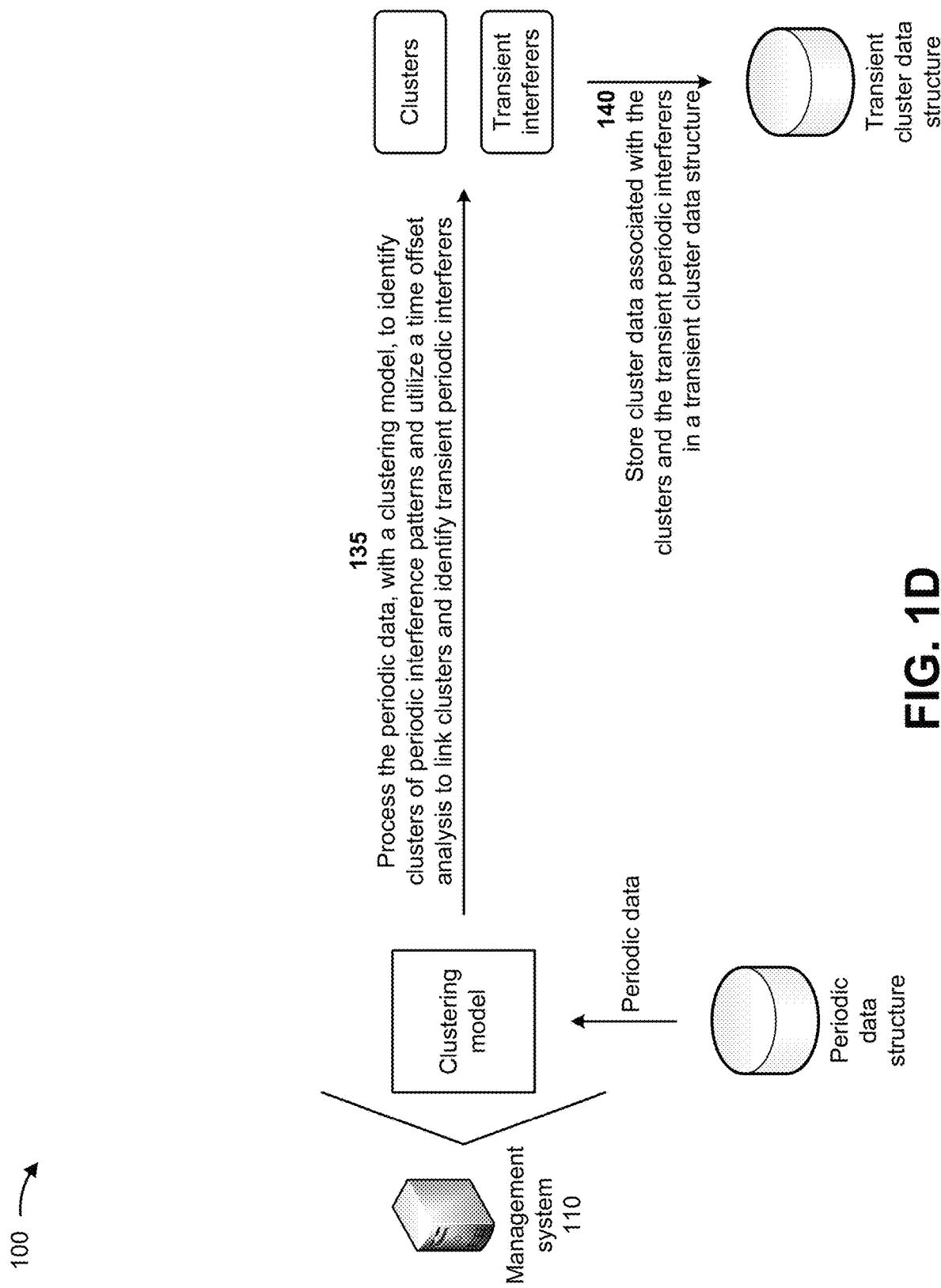

As shown in FIG. 1D, and by reference number 135, the management system 110 may process the periodic data, with a clustering model, to identify clusters of periodic interference patterns, and may utilize a time offset analysis to link clusters and identify transient periodic interferers. For example, transient periodic interferers may include sources of interference that move through the network, may be difficult to quantify, may only appear at a base station 105 for a brief period of time, may generate an interference mean below a detection threshold, and/or the like. A transient periodic interferer may include faulty equipment and/or jammers in a stationary location but only operating during certain time periods (e.g., restaurants, stores, offices, and/or the like), faulty equipment and/or jammers on public transit moving through a network, vehicles and boats in and around harbors, ports, and major highways, and/or the like.

The management system 110 may apply the clustering model to the periodic data to identify the clusters of periodic interference patterns. The clustering model may include an unsupervised learning model that geographically clusters time bound groups of periodic interference patterns based on the PRB data and the magnitudes associated with the periodic interference patterns. In some implementations, the management system 110 may utilize a k-nearest neighbors (KNN) model to cluster the periodic interference patterns based on similarities in a sorted dominant frequencies vector. For example, the management system 110 may select, from a vector, a quantity (e.g., "k") of dominant frequencies to consider (e.g., a quantity that may be tuned or changed based on a cell density of a location being analyzed). If the quantity is ten (k=10), the management system 110 may select the top ten frequencies and magnitudes from the vector, and may process the selected frequencies and magnitudes and frequency vectors of adjacent cell sites with the KNN model. After determining the KNNs, the management system 110 may determine that one or more of the cell sites (e.g., the base stations 105) have similar periodic interference patterns and hence are being affected by the same periodic interferer.

The management system 110 may process each of the clusters of periodic interference patterns, with a time offset analysis, to link clusters and identify the transient periodic interferers. For example, the management system 110 may utilize the time offset analysis to identify adjacencies of each cluster to other clusters, and to link adjacent clusters together. In some implementations, the management system 110 may perform a cross-correlation of the clusters of periodic interference patterns with a main cell site. The main cell site may be defined in multiple ways, such as a cell site with the greatest level of interference at the time of the cross-correlation analysis. An example of a cross-correlation analysis is described below in connection with FIG. 1E.

As further shown in FIG. 1D, and by reference number 140, the management system 110 may store cluster data associated with the clusters and the transient periodic interferers in a transient cluster data structure. For example, clusters may be associated with cluster data identifying the PRB data, time ranges, magnitudes, periodic event identifiers, linked cluster identifiers, transient identifiers, and/or the like associated with the clusters. The management system 110 may store the cluster data identifying the PRB data, the time ranges, the magnitudes, the periodic event identifiers, the linked cluster identifiers, the transient identifiers, and/or the like, associated with the clusters, in a transient cluster data structure (e.g., a database, a table, a list, and/or the like) associated with the management system 110. The cluster data may enable the management system 110 to provide to users of the management system 110 information indicating that interferences are periodic and transient and that enables interferences to be grouped. The management system 110 may also utilize the cluster data stored in the transient cluster data structure to identify transient sources of interference and/or paths of the transient sources of interference, as described below.

Figure 1E:
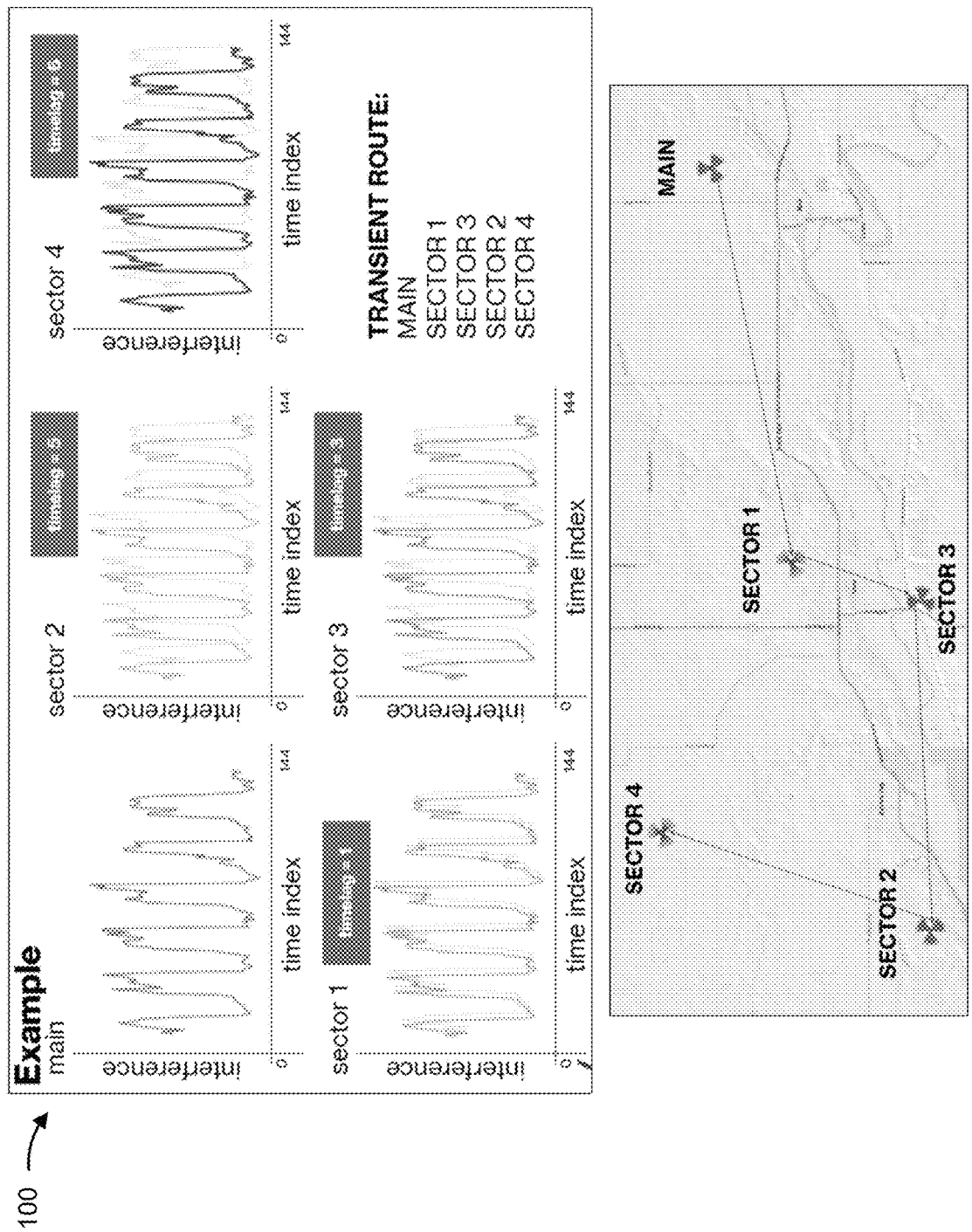

FIG. 1E depicts an example of a cross-correlation analysis performed by the management system 110. As shown, the example may include five sectors (e.g., cell sites), such as a main sector, sector 1, sector 2, sector 3, and sector 4. The graphs of FIG. 1E depict interference patterns associated with the five sectors over a same time period. The management system 110 may execute a cross-correlation analysis of the four sectors (e.g., sector 1, sector 2, sector 3, and sector 4) against the main sector to determine that four sectors match and have a time lag value for a greatest cross correlation for each sector. If an interference pattern one of the four sectors is subjected to the time lag value (e.g., X hours), the interference pattern will be most similar to the interference pattern of the main sector. The management system 110 may perform this process for all four sectors to obtain a time lag value of T0 for the main sector, a time lag value of T1 for sector 1, a time lag value of T5 for sector 2, a time lag value of T3 for sector 3, and a time lag value of T6 for sector 4, where T0<T1<T3<T5<T6. Based on the cross-correlation time lag values, the management system 110 may determine that the interference signal was observed on sectors in the following order: the main sector, then sector 1, then sector 3, then sector 2, and finally sector 4, as shown in the map of FIG. 1E.

Figure 1F:
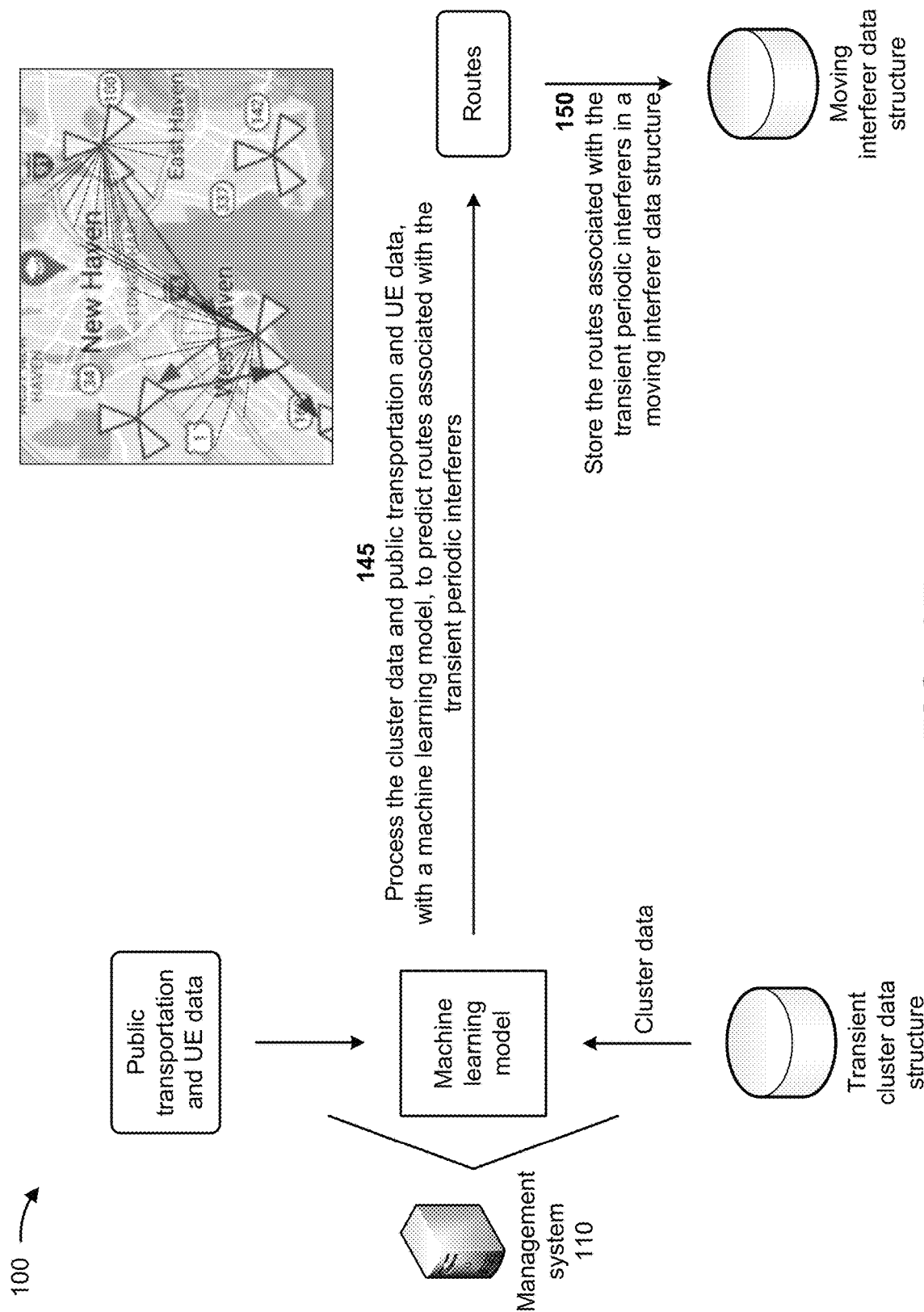

As shown in FIG. 1F, and by reference number 145, the management system 110 may process the cluster data and public transportation and UE data, with a model (e.g., a machine learning model), to predict routes associated with the transient periodic interferers. For example, the public transportation and UE data may include data identifying highways, major roads, routes, public transportation schedules, waterways, locations of the UEs, movement of the UEs, and/or the like in relation to the cell sites (e.g., the base stations 105) associated with the cluster data. The management system 110 may utilize the machine learning model to predict the routes associated with the transient periodic interferers. For example, the management system 110 may utilize the machine learning model to combine data associated with the cell sites (e.g., identified in the cluster data) with vectors and the public transportation and UE data and to predict the routes, public transportation types (e.g., bus, train, car, ferry, and/or the like), and public transportation schedules associated with the transient periodic interferers. This may enable the management system 110 to predict actual sources of the transient periodic interferences in space and time so that field engineers can more easily identify the actual sources of the transient periodic interferences.

In some implementations, the management system 110 may utilize vectorized route data for public transportation routes to have a vector representation of the public transportation routes (e.g., roadways, train routes, bus routes, ferry routes, and/or the like). The cluster data may include a vector representation of the transient interference population. The management system 110 may utilize the machine learning model (e.g., a KNN model) to select route vector indices that are nearby. The machine learning model may compute a distance (e.g., a Euclidean distance) from each transient cluster (e.g., a determined transient periodic interferer) vector index to all of the selected route vector indices. The machine learning model may store a minimum N results for each transient cluster entry, and may repeat the process over an entire cluster. The machine learning model may generate a quantity (e.g., M) of routes with an overall minimum distance, using a weighted cost function, for each transient cluster.

For example, as shown in the graph of FIG. 1F, three sets of route data and two cell sites may be included in a first section of a transient cluster. The management system 110 may store distances that satisfy a criterion, such as, for example, three distances. For the first cell, interstate 91 (I-91) may include minimum distances of 1.0, 1.2, and 2.0; interstate 95 (I-95) may include minimum distances of 1.2, 1.1, and 1.5; and route 1 may include minimum distances of 2.5, 2.4, and 2.3. For the second cell, I-91 may include minimum distances of 4.0, 4.1, and 4.2; 1-95 may include minimum distances of 0.9, 1.0, and 1.1; and route 1 may include minimum distances of 2.1, 2.5, and 2.6. Based on this example, the management system 110 may determine that I-95 has an average distance from the second cell of 1.13 and appears on both cells in the cluster based on the criterion; that I-91 has an average distance of 1.4 from the first cell based on the criterion (e.g., the distance from the second cell is larger than an inter-site distance and may be removed); and that route 1 has an average of distance of 2.4 from both cells and appears on both cells. Thus, the management system 110 may determine that the source of transient periodic interference is traveling on I-95 and not on route 1. However, the management system 110 may include I-91 as a potential route interchange for the source of transient periodic interference.

As further shown in FIG. 1F, and by reference number 150, the management system 110 may store the routes associated with the transient periodic interferers in a moving interferer data structure. For example, the routes may include data identifying the routes, transportation types, confidence levels, transient identifiers, affected base stations 105, and/or the like associated with the transient periodic interferers. The management system 110 may store the data identifying the routes, transportation types, confidence levels, transient identifiers, affected base stations 105, and/or the like, associated with the transient periodic interferers, in a moving interferer data structure (e.g., a database, a table, a list, and/or the like) associated with the management system 110. The routes may enable the management system 110 to provide to users of the management system 110 information for use in locating transient periodic interferers with predicted routes, types of movement (e.g., train route, bus route, ferry route, vehicle route, and/or the like), schedules, and/or the like.

Figure 1G:
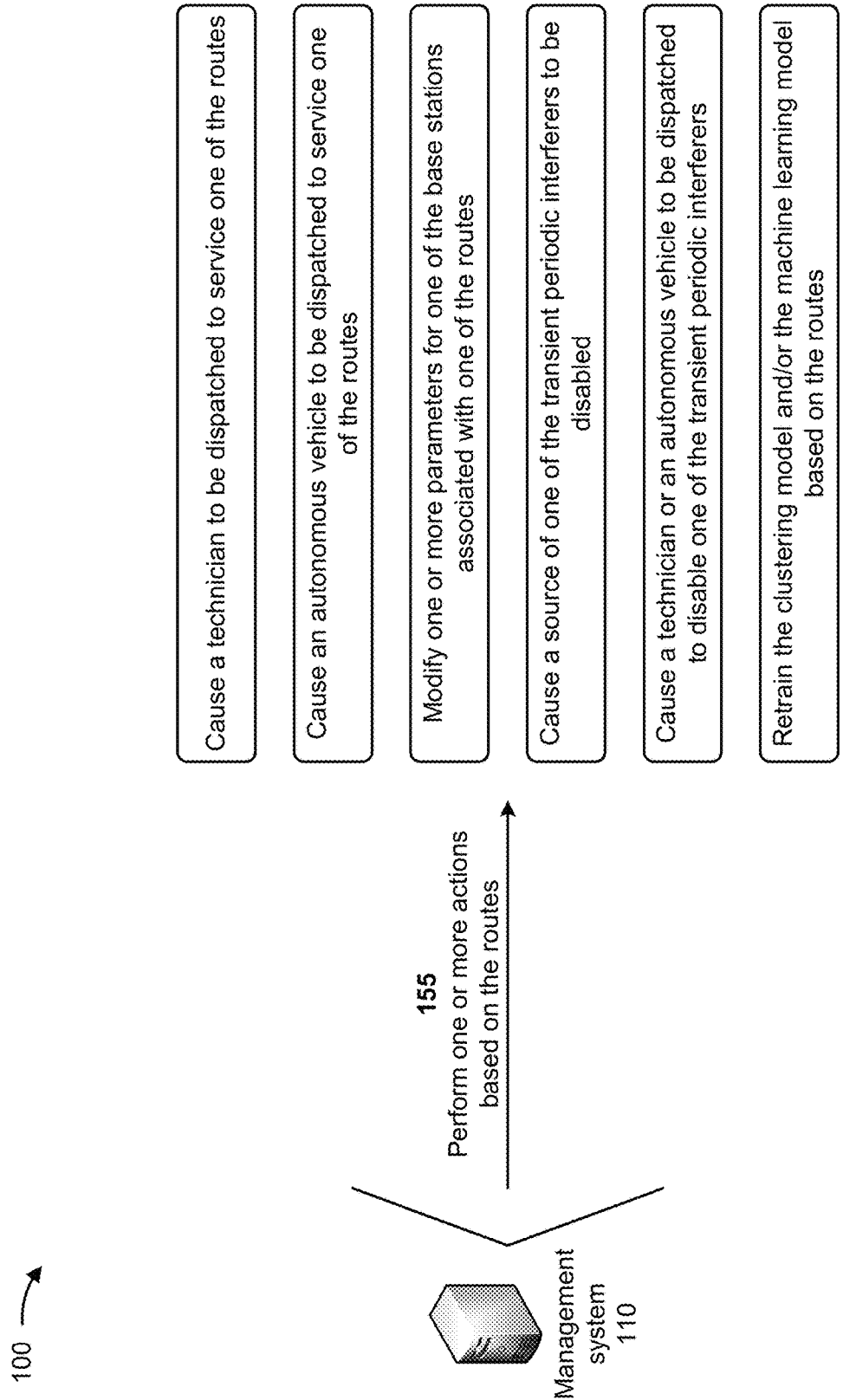

As shown in FIG. 1G, and by reference number 155, the management system 110 may perform one or more actions based on the routes. In some implementations, performing the one or more actions includes the management system 110 causing a technician to be dispatched to service one of the routes. For example, the management system 110 may provide, to a technician (e.g., a UE of the technician), a notification identifying one of the routes for a transient periodic interferer, a location of the route, directions to the route, and/or the like. The technician may utilize the notification to travel to the route and attempt to eliminate or service the transient periodic interferer. In this way, the management system 110 may conserve computing resources, networking resources, and/or other resources that would have otherwise been consumed by degrading call success rates for UEs based on periodic interference and transient interference, providing poor voice quality for UEs based on periodic interference and transient interference, and/or the like.

In some implementations, performing the one or more actions includes the management system 110 causing an autonomous vehicle to be dispatched to service one of the routes. For example, the management system 110 may provide, to an autonomous vehicle (e.g., a drone, a robot, and/or the like), instructions identifying one of the routes for a transient periodic interferer, a location of the route, directions to the route, actions to perform on the transient periodic interferer, and/or the like. The autonomous vehicle may utilize the instructions to travel to the route and attempt to eliminate or service the transient periodic interferer. In this way, the management system 110 may conserve computing resources, networking resources, and/or other resources that would have otherwise been consumed by degrading call success rates for UEs based on periodic interference and transient interference, providing reduced data throughput for UEs based on periodic interference and transient interference, dispatching technicians to unsuccessfully identify and/or locate sources of periodic interference and transient interference, and/or the like.

In some implementations, performing the one or more actions includes the management system 110 modifying one or more parameters for one of the base stations 105 associated with one of the routes. For example, the management system 110 may identify a base station 105 associated with a route experiencing transient periodic interference, and may determine parameters of the base station 105 to modify when the transient periodic interferer is present (e.g., adjust an antenna angle, increase antenna power, and/or the like). The management system 110 may instruct the base station 105 to modify the parameters (e.g., antenna angle, antenna power, a quantity of antennas, and/or the like) when the transient periodic interferer is present. In this way, the management system 110 may conserve computing resources, networking resources, and/or other resources that would have otherwise been consumed by providing poor voice quality for UEs based on periodic interference and transient interference, providing reduced data throughput for UEs based on periodic interference and transient interference, dispatching technicians to unsuccessfully identify and/or locate sources of periodic interference and transient interference, and/or the like.

In some implementations, performing the one or more actions includes the management system 110 causing a source of one of the transient periodic interferers to be disabled. For example, the management system 110 may determine that the source of the transient periodic interference is a network device controlled by the management system 110, and that the network device is malfunctioning. The management system 110 may cause the malfunctioning network device to be disabled to cause the transient periodic interference to cease. In this way, the management system 110 may conserve computing resources, networking resources, and/or other resources that would have otherwise been consumed by degrading call success rates for UEs based on periodic interference and transient interference, and/or the like.

In some implementations, performing the one or more actions includes the management system 110 causing a technician or an autonomous vehicle to be dispatched to disable one of the transient periodic interferers. For example, the management system 110 may determine that the source of the transient periodic interference is a network device controlled by the management system 110, and that the network device is malfunctioning. The management system 110 may cause a technician or an autonomous vehicle to be dispatched to disable the malfunctioning network device and cause the transient periodic interference to cease. In this way, the management system 110 may conserve computing resources, networking resources, and/or other resources that would have otherwise been consumed by providing poor voice quality for UEs based on periodic interference and transient interference, providing reduced data throughput for UEs based on periodic interference and transient interference, dispatching technicians to unsuccessfully identify and/or locate sources of periodic interference and transient interference, and/or the like.

In some implementations, performing the one or more actions includes the management system 110 retraining the clustering model and/or the machine learning model based on the routes. For example, the management system 110 may utilize the routes as additional training data for retraining the clustering model and/or the machine learning model, thereby increasing the quantity of training data available for training the clustering model and/or the machine learning model. Accordingly, the management system 110 may conserve computing resources associated with identifying, obtaining, and/or generating historical data for training the clustering model and/or the machine learning model relative to other systems for identifying, obtaining, and/or generating historical data for training machine learning models.

In this way, the management system 110 detects and mitigates periodic and transient interference in a network. For example, the management system 110 may identify periodic interference patterns associated with the network, and may identify transient, or moving, interference patterns associated with the network based on the periodic interference patterns. The management system 110 may predict a route and/or a type of transportation associated with a source of the transient interference patterns. Thus, the management system 110 may conserve computing resources, networking resources, and/or other resources that would have otherwise been consumed by degrading call success rates for UEs based on periodic interference and transient interference, providing poor voice quality for UEs based on periodic interference and transient interference, providing reduced data throughput for UEs based on periodic interference and transient interference, dispatching technicians to unsuccessfully identify and/or locate sources of periodic interference and transient interference, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
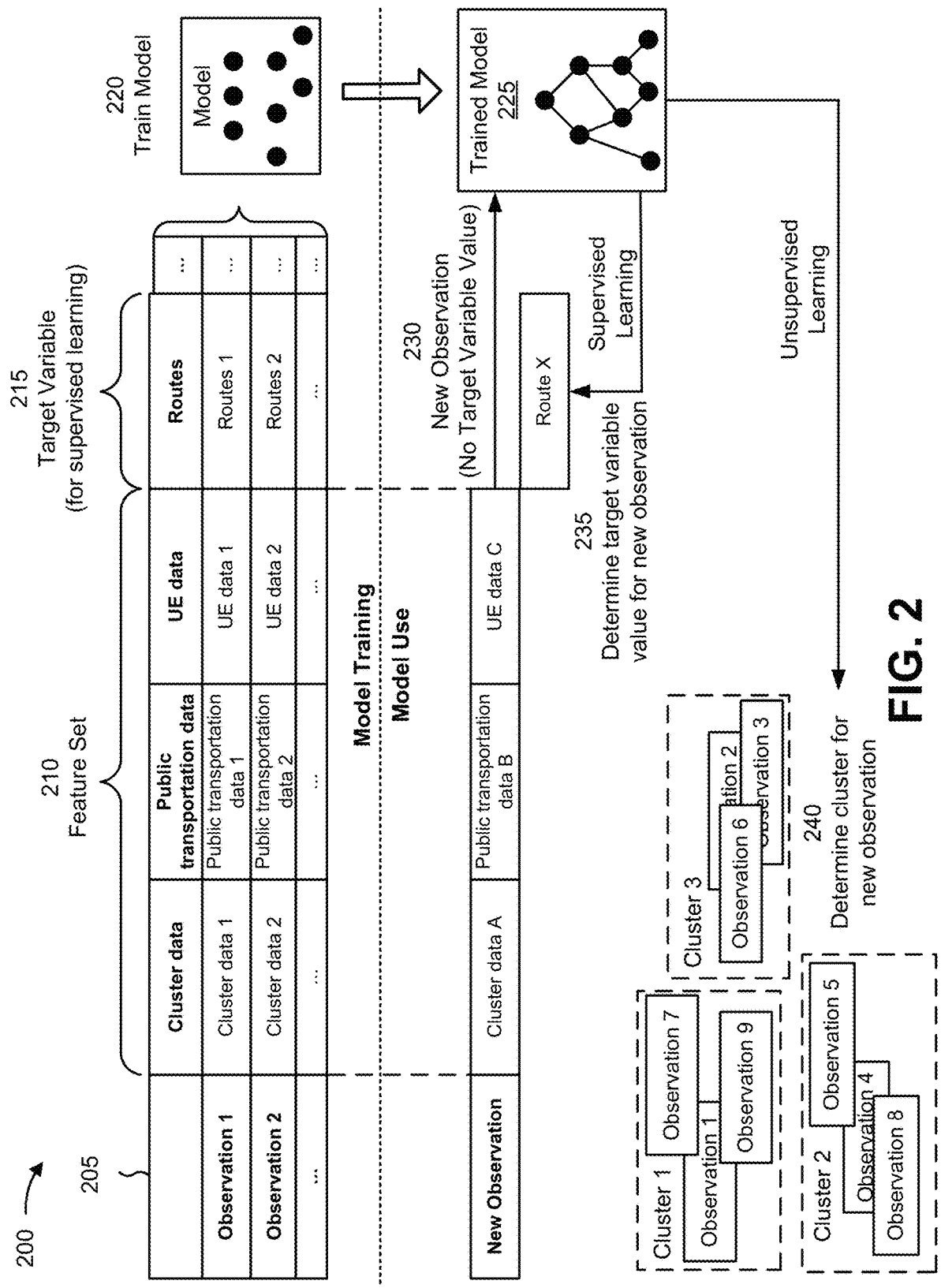
FIG. 2 is a diagram illustrating an example of training and using a machine learning model in connection with detecting and mitigating periodic and transient interference in a network.

FIG. 2 is a diagram illustrating an example 200 of training and using a machine learning model in connection with detecting and mitigating periodic and transient interference in a network. The machine learning model training and usage described herein may be performed using a machine learning system. The machine learning system may include or may be included in a computing device, a server, a cloud computing environment, or the like, such as the management system 110, described in more detail elsewhere herein.

As shown by reference number 205, a machine learning model may be trained using a set of observations. The set of observations may be obtained from training data (e.g., historical data), such as data gathered during one or more processes described herein. In some implementations, the machine learning system may receive the set of observations (e.g., as input) from the base stations 105, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the base stations 105. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of cluster data, a second feature of public transportation data, a third feature of UE data, and so on. As shown, for a first observation, the first feature may have a value of cluster data 1, the second feature may have a value of public transportation data 1, the third feature may have a value of UE data 1, and so on. These features and feature values are provided as examples, and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 200, the target variable is routes, which has a value of routes 1 for the first observation. The feature set and target variable described above are provided as examples, and other examples may differ from what is described above.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of cluster data A, a second feature of public transportation data B, a third feature of UE data C, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 225 may predict a value of route X for the target variable of routes for the new observation, as shown by reference number 235. Based on this prediction, the machine learning system may provide a first recommendation, may provide output for determination of a first recommendation, may perform a first automated action, and/or may cause a first automated action to be performed (e.g., by instructing another device to perform the automated action), among other examples.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a cluster data cluster), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a public transportation data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to detecting and mitigating periodic and transient interference in a network. The machine learning system enables recognition and/or identification of tens, hundreds, thousands, or millions of features and/or feature values for tens, hundreds, thousands, or millions of observations, thereby increasing accuracy and consistency and reducing delay associated with detecting and mitigating periodic and transient interference in a network relative to requiring computing resources to be allocated for tens, hundreds, or thousands of operators to manually detect and mitigate periodic and transient interference in a network using the features or feature values.

As indicated above, FIG. 2 is provided as an example. Other examples may differ from what is described in connection with FIG. 2.

Figure 3:
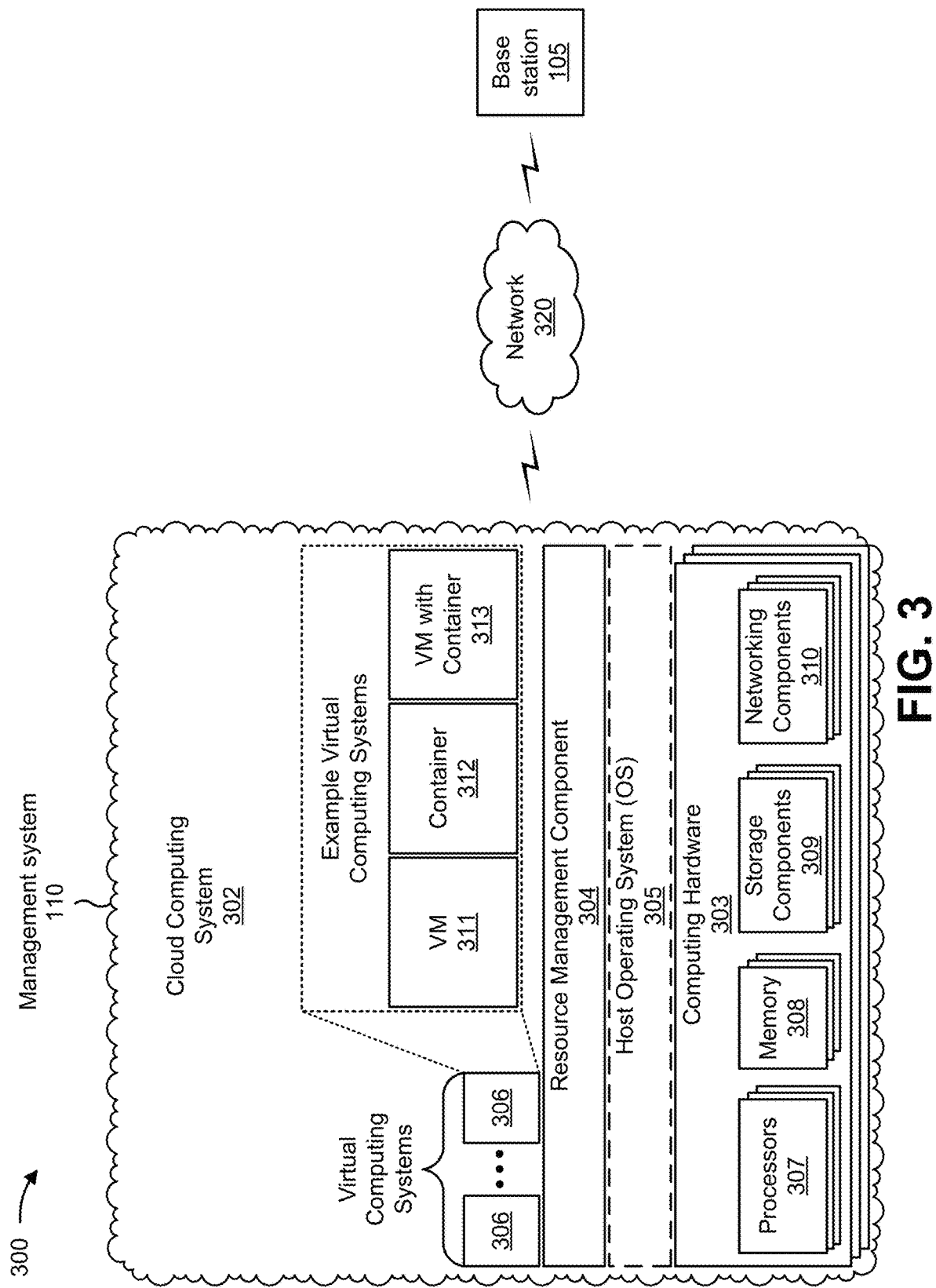
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the management system 110, which may include one or more elements of and/or may execute within a cloud computing system 302. The cloud computing system 302 may include one or more elements 303-313, as described in more detail below. As further shown in FIG. 3, the environment 300 may include the base station 105 and/or a network 320. Devices and/or elements of the environment 3200 may interconnect via wired connections and/or wireless connections.

The base station 105 includes one or more devices capable of transferring traffic, such as audio, video, text, and/or other traffic, destined for and/or received from a UE. For example, the base station 105 may include an eNodeB (eNB) associated with a long term evolution (LTE) network that receives traffic from and/or sends traffic to a core network, a gNodeB (gNB) associated with a RAN of a fifth generation (5G) network, a base transceiver station, a radio base station, a base station subsystem, a cellular site, a cellular tower, an access point, a transmit receive point (TRP), a radio access node, a macrocell base station, a microcell base station, a picocell base station, a femtocell base station, and/or another network entity capable of supporting wireless communication. The base station 105 may support, for example, a cellular radio access technology (RAT). The base station 105 may transfer traffic between a UE (e.g., using a cellular RAT), one or more other base stations 105 (e.g., using a wireless interface or a backhaul interface, such as a wired backhaul interface), and/or a core network. The base station 105 may provide one or more cells that cover geographic areas.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the management system 110 may include one or more elements 303-313 of the cloud computing system 302, may execute within the cloud computing system 302, and/or may be hosted within the cloud computing system 302, in some implementations, the management system 110 may not be cloud-based (e.g., may be implemented outside of a cloud computing system) or may be partially cloud-based. For example, the management system 110 may include one or more devices that are not part of the cloud computing system 302, such as the device 400 of FIG. 4, which may include a standalone server or another type of computing device. The management system 110 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
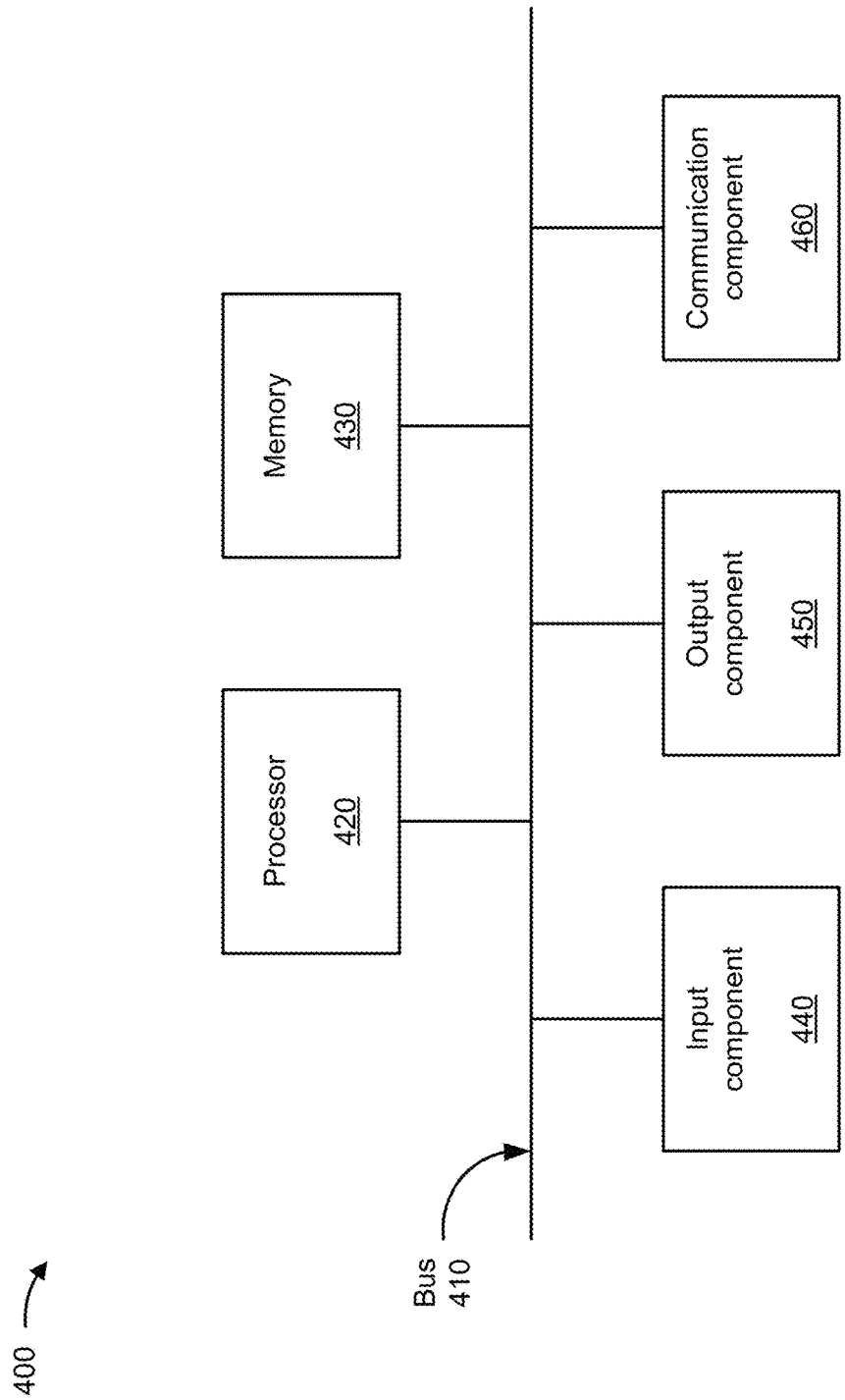
FIG. 4 is a diagram of example components of one or more devices of FIG. 3

FIG. 4 is a diagram of example components of a device 400, which may correspond to the base station 105 and/or the management system 110. In some implementations, the base station 105 and/or the management system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for detecting and mitigating periodic and transient interference in a network. In some implementations, one or more process blocks of FIG. 5 may be performed by a device (e.g., the management system 110). In some implementations, one or more process blocks of FIG. 5 may be performed by another device or a group of devices separate from or including the device, such as a base station (e.g., the base station 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include identifying, based on frequency domain PRB data, periodic interference patterns associated with a network with a plurality of base stations (block 510). For example, the device may identify, based on frequency domain PRB data, periodic interference patterns associated with a network with a plurality of base stations, as described above. In some implementations, identifying the periodic interference patterns associated with the network includes determining periodicities associated with the frequency domain PRB data, and identifying the periodic interference patterns based on the periodicities associated with the frequency domain PRB data. In some implementations, identifying the periodic interference patterns associated with the network includes sorting the frequency domain PRB data based on frequency magnitudes and to generate a sorted list, and identifying the periodic interference patterns associated with the network based on the sorted list.

As further shown in FIG. 5, process 500 may include processing the periodic interference patterns, with a clustering model, to identify clusters of periodic interference patterns (block 520). For example, the device may process periodic data associated with the periodic interference patterns, with a clustering model, to identify clusters of periodic interference patterns, as described above. In some implementations, processing the periodic data associated with the periodic interference patterns, with the clustering model, to identify the clusters of periodic interference patterns includes processing the periodic interference patterns to determine neighboring periodic interference patterns, and performing a cross-correlation of the neighboring periodic interference patterns to identify the clusters of periodic interference patterns. In some implementations, processing the periodic interference patterns to determine the neighboring periodic interference patterns includes processing the periodic interference patterns, with a k-nearest neighbor model, to determine the neighboring periodic interference patterns.

As further shown in FIG. 5, process 500 may include utilizing a time offset analysis to link clusters and identify a transient periodic interferer (block 530). For example, the device may utilize a time offset analysis to link clusters and identify a transient periodic interferer, as described above.

As further shown in FIG. 5, process 500 may include processing the clusters, the transient periodic interferer, and public transportation data, with a model, to predict a route (block 540). For example, the device may process cluster data associated with the clusters and the transient periodic interferer, and public transportation data, with a model, to predict a route associated with the transient periodic interferer, as described above. In some implementations, processing the cluster data associated with the clusters and the transient periodic interferer, and the public transportation data, with the model, to predict the route associated with the transient periodic interferer includes computing distances between the clusters and routes included in the public transportation data to identify a set of routes with a minimum distance, and performing a route distance cost minimization on the set of routes to predict the route associated with the transient periodic interferer.

As further shown in FIG. 5, process 500 may include performing one or more actions based on the route (block 550). For example, the device may perform one or more actions based on the route associated with the transient periodic interferer, as described above. In some implementations, performing the one or more actions includes one or more of causing a technician to be dispatched to service the route, causing an autonomous vehicle to be dispatched to service the route, or modifying one or more parameters for one of the plurality of base stations. In some implementations, performing the one or more actions includes causing a technician or an autonomous vehicle to be dispatched to disable the transient periodic interferer. In some implementations, performing the one or more actions includes one or more of causing a source of the transient periodic interferer to be disabled, or retraining the clustering model or the machine learning model based on the route.

In some implementations, process 500 includes receiving time domain PRB data, and transforming the time domain PRB data into the frequency domain PRB data.

In some implementations, process 500 includes one or more of providing the periodic interference patterns for display, providing the cluster data for display, or providing the route associated with the transient periodic interferer for display.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
identifying, by a device and based on frequency domain physical resource block (PRB) data, periodic interference patterns associated with a network with a plurality of base stations;
processing, by the device, the periodic interference patterns, with a clustering model, to identify clusters of periodic interference patterns;
utilizing, by the device, a time offset analysis to link clusters and identify a transient periodic interferer;
processing, by the device, cluster data associated with the clusters and the transient periodic interferer, and public transportation data, with a model, to predict a route associated with the transient periodic interferer; and
performing, by the device, one or more actions based on the route associated with the transient periodic interferer.

2. The method of claim 1, further comprising:
receiving time domain PRB data; and
transforming the time domain PRB data into the frequency domain PRB data.

3. The method of claim 1, wherein processing the cluster data comprises:
computing distances between the clusters and routes included in the public transportation data to identify a set of routes with a minimum distance; and
performing a route distance cost minimization on the set of routes to predict the route associated with the transient periodic interferer.

4. The method of claim 1, wherein identifying the periodic interference patterns associated with the network comprises:
determining periodicities associated with the frequency domain PRB data; and
identifying the periodic interference patterns based on the periodicities associated with the frequency domain PRB data.

5. The method of claim 1, wherein identifying the periodic interference patterns associated with the network comprises:
sorting the frequency domain PRB data based on frequency magnitudes and to generate a sorted list; and
identifying the periodic interference patterns associated with the network based on the sorted list.

6. The method of claim 1, wherein processing the periodic interference patterns, comprises:
processing the periodic interference patterns to determine neighboring periodic interference patterns; and
performing a cross-correlation of the neighboring periodic interference patterns to identify the clusters of periodic interference patterns.

7. The method of claim 6, wherein processing the periodic interference patterns to determine the neighboring periodic interference patterns comprises:
processing the periodic interference patterns, with a k-nearest neighbor model, to determine the neighboring periodic interference patterns.

8. A device, comprising:
one or more memories; and
one or more processors, coupled to the one or more memories, configured to:
receive time domain physical resource block (PRB) data associated with a plurality of base stations of a network;
transform the time domain PRB data into frequency domain PRB data;
identify, based on the frequency domain PRB data, periodic interference patterns associated with the network;
process periodic data associated with the periodic interference patterns, with a clustering model, to identify clusters of periodic interference patterns;
utilize a time offset analysis to link clusters and identify a transient periodic interferer;
process cluster data associated with the clusters and the transient periodic interferer, and public transportation data, with a machine learning model, to predict a route associated with the transient periodic interferer;
store the periodic data, the cluster data, and data associated with the route in a data structure; and
perform one or more actions based on the route associated with the transient periodic interferer.

9. The device of claim 8, wherein the one or more processors, to process the cluster data associated with the clusters and the transient periodic interferer, and the public transportation data, with the machine learning model, to predict the route, are configured to:
compute Euclidean distances between the clusters and routes included in the public transportation data to identify a set of routes with a minimum distance; and
perform a route distance cost minimization on the set of routes to predict the route associated with the transient periodic interferer.

10. The device of claim 8, wherein the one or more processors, to identify the periodic interference patterns associated with the network, are configured to:
determine periodicities associated with the frequency domain PRB data; and
identify the periodic interference patterns based on the periodicities associated with the frequency domain PRB data.

11. The device of claim 8, wherein the one or more processors are further configured to one or more of:
provide the periodic interference patterns for display;
provide the cluster data for display; or
provide the route associated with the transient periodic interferer for display.

12. The device of claim 8, wherein the one or more processors, to perform the one or more actions, are configured to one or more of:
cause a technician to be dispatched to service the route;
cause an autonomous vehicle to be dispatched to service the route; or
modify one or more parameters for one of the plurality of base stations.

13. The device of claim 8, wherein the one or more processors, to perform the one or more actions, are configured to:
cause a technician or an autonomous vehicle to be dispatched to disable the transient periodic interferer.

14. The device of claim 8, wherein the one or more processors, to perform the one or more actions, are configured to one or more of:
- cause a source of the transient periodic interferer to be disabled; or
- retrain the clustering model or the machine learning model based on the route.

15. A non-transitory computer-readable medium storing a set of instructions, the set of instructions comprising:
one or more instructions that, when executed by one or more processors of a device, cause the device to:
- receive time domain physical resource block (PRB) data associated with a plurality of base stations of a network;
- process the time domain PRB data, with a fast Fourier transform model, to convert the time domain PRB data into frequency domain PRB data;
- identify, based on the frequency domain PRB data, periodic interference patterns associated with the network;
- process periodic data associated with the periodic interference patterns, with a clustering model, to identify clusters of periodic interference patterns;
- utilize a time offset analysis to link clusters and identify a transient periodic interferer;
- process cluster data associated with the clusters and the transient periodic interferer, and public transportation data, with a machine learning model, to predict a route associated with the transient periodic interferer; and
- perform one or more actions based on the route associated with the transient periodic interferer.

16. The non-transitory computer-readable medium of claim 15, wherein the one or more instructions, that cause the device to identify the periodic interference patterns associated with the network, cause the device to:
- sort the frequency domain PRB data based on frequency magnitudes and to generate a sorted list; and
- identify the periodic interference patterns associated with the network based on the sorted list.

17. The non-transitory computer-readable medium of claim 15, wherein the one or more instructions, that cause the device to process the periodic data associated with the periodic interference patterns, with the clustering model, to identify the clusters of periodic interference patterns, cause the device to:
- process the periodic data, with a k-nearest neighbor model, to determine neighboring periodic interference patterns; and
- perform a cross-correlation of the neighboring periodic interference patterns to identify the clusters of periodic interference patterns.

18. The non-transitory computer-readable medium of claim 15, wherein the one or more instructions, that cause the device to process the cluster data associated with the clusters and the transient periodic interferer, and the public transportation data, with the machine learning model, to predict the route, cause the device to:
- compute Euclidean distances between the clusters and routes included in the public transportation data to identify a set of routes with a minimum distance; and
- perform a route distance cost minimization on the set of routes to predict the route associated with the transient periodic interferer.

19. The non-transitory computer-readable medium of claim 15, wherein the one or more instructions, that cause the device to identify the periodic interference patterns associated with the network, cause the device to:
- determine periodicities associated with the frequency domain PRB data; and
- identify the periodic interference patterns based on the periodicities associated with the frequency domain PRB data.

20. The non-transitory computer-readable medium of claim 15, wherein the one or more instructions, that cause the device to perform the one or more actions, cause the device to one or more of:
- cause a technician to be dispatched to service the route;
- cause an autonomous vehicle to be dispatched to service the route;
- modify one or more parameters for one of the plurality of base stations;
- cause a technician or an autonomous vehicle to be dispatched to disable the transient periodic interferer;
- cause a source of the transient periodic interferer to be disabled; or
- retrain the clustering model or the machine learning model based on the route.

* * * * *